Figure 1:
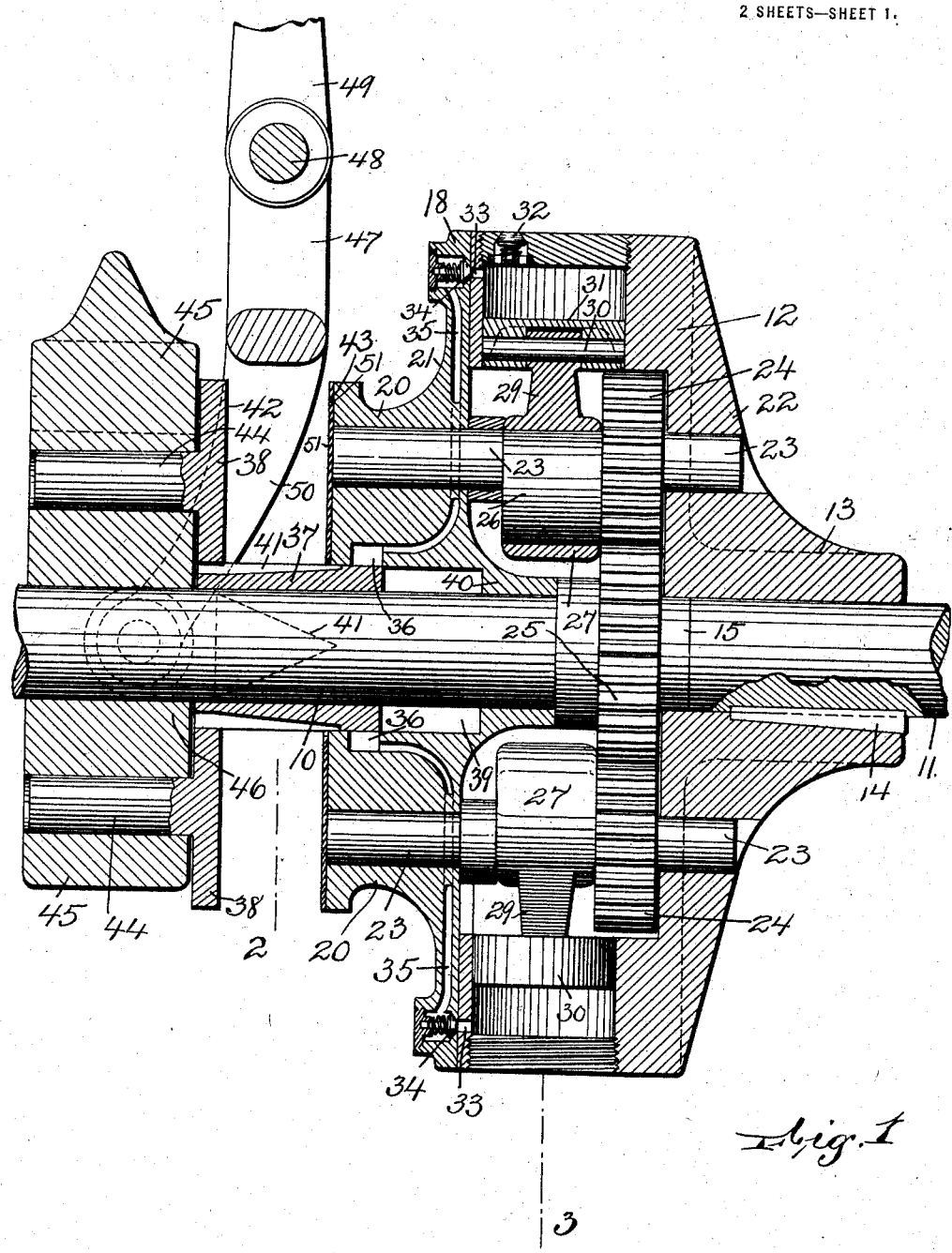

E. SCHMITT.
TRANSMISSION.
APPLICATION FILED APR. 3, 1917.

1,300,225.

Patented Apr. 8, 1919.
2 SHEETS—SHEET 2.

INVENTOR
Edmund Schmitt
BY
Wm H Caufield
ATTORNEYS

UNITED STATES PATENT OFFICE.

EDMUND SCHMITT, OF BRIDGEPORT, CONNECTICUT.

TRANSMISSION.

1,300,225.  Specification of Letters Patent.  Patented Apr. 8, 1919.

Application filed April 3, 1917. Serial No. 159,409.

*To all whom it may concern:*

Be it known that I, EDMUND SCHMITT, a citizen of the United States, and a resident of Bridgeport, county of Fairfield, and State of Connecticut, have invented certain new and useful Improvements in Transmissions, of which the following is a specification.

This invention relates to an improved transmission that is positive in its action and is simple so that its operation is assured, the device furthermore being disposed so that it is very compact and occupies but little space where it is used.

The invention is adapted for use in many different situations, for instance, on automobiles, motor boats and similar means of transportation, but it is particularly designed for automobile purposes.

The invention is designed to provide a transmission of this kind which prevents the noise and rasping due to the changing of gears in the ordinary transmission on the vehicle, the device being substantially silent in its operation and being easily controlled, the changes from one speed to another being gradual and not calculated to unduly strain the vehicle nor the transmission part thereof.

The invention is designed to provide a transmission which has two members rotatable with respect to each other, and also comprises a means for compressing fluid, air being employed as a fluid, the compression means being adapted to be operated by the rotation of the members with respect to each other. When the passage of air from the air compressing means is stopped or reduced, the air compressing means, because of the resistance of the air, is prevented from operating, and thus acts to hold the members against rotation with respect to each other to a greater or less extent, according to the density or degree of compression of the air compressed by the air compressing means and flowing therefrom through a suitable discharge passage. When the discharge passage is thus partially or entirely closed the driven member rotates at less speed than the driving member, or the two rotate in unison, according to the extent to which the flow of air through the discharge passage is restricted.

The invention is further designed to provide such type of transmission which is to a great extent inclosed, is free from any ex- cessive or large openings for the admission of dust, and another advantage is the fact that when the devices are used to give the vehicle considerable speed, or in other words, as the speed of the vehicle increases, due to the gradual locking together of the clutch members, the movement of the parts inside the transmission is reduced or lessened until finally when the driven and driving members rotate in unison, the air compressing means are motionless, except for being carried around in the transmission, which, of course, entails no wear on them.

The invention is further designed to provide a transmission from which the air can be conducted to the muffler of the vehicle and thus assist in projecting through the gases and the products of combustion from the engine to said muffler and thus materially reduce what little back pressure results from the use of the muffler.

Figure 2:
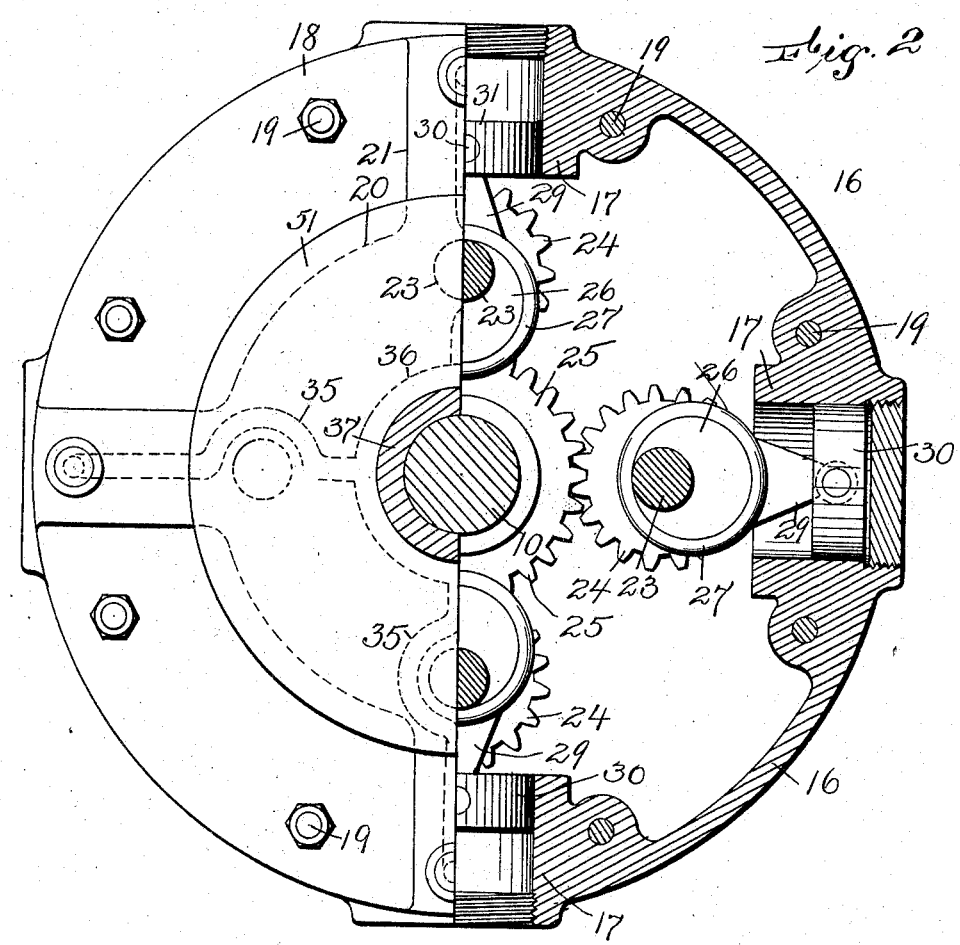
Figure 3:
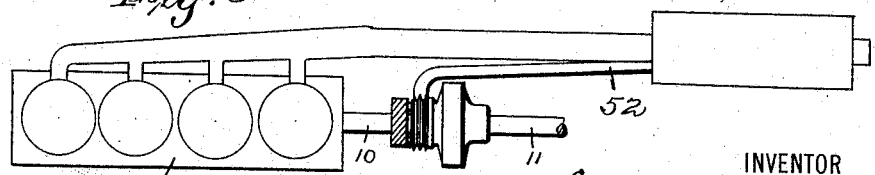

The invention is illustrated in the accompanying drawings, in which Figure 1 is a vertical section through the improved transmission. Fig. 2 is a section, the left hand side of the figure being taken on line 2 in Fig. 1, and the right hand half being taken on the line 3 in Fig. 1. Fig. 3 is a diagrammatic view showing the attachment of the device to the muffler.

In the accompanying drawings I show one embodiment of the invention, it being understood, of course, that alterations can be made in the structure, and the relation and arrangement of the parts can be changed to an extent without materially affecting the scope of the invention as set forth in the claims.

The form illustrated shows the driving member consisting of a shaft 10 which, for the purpose of this description, is assumed to be continuously rotating in order to clearly describe the operation of the device. The driven member in the form shown consists of a driven shaft 11 on which is mounted a casing or frame into which certain mechanism is inserted that is made operative for connecting the parts by reason of the resistance to a fluid pressure compressing means, and which is made inoperative by the removal of such resistance to the fluid compressing means. In the form shown the casing consists of a part 12 having a hub 13 by means of which it is fastened to the shaft 11, the key 14 being one form of means for connecting these parts so that they will rotate in unison, and the part 13 is also recessed so as to receive the projecting end 15 of the shaft 10 so as to insure the alinement of the shafts 10 and 11. The part 12 is provided with a circumferential flange 16 which is thickened at separated points, in the drawing four being shown, these points being bored to form the cylinders 17. On the face of the part 12 is a plate 18 fastened by suitable means, such as the bolts 19, the plate 18 being provided with a projecting part or flange 20 with ribs 21 thereon, these ribs being in line with the ribs 22 of the part 12 so as to provide bearings for the jack-shafts 23, each jack-shaft being provided with a gear 24, each gear 24 being in mesh with a gear 25 on the driving shaft 10, the gear 25 being fastened so that it rotates with the driving shaft 10 and is therefore part of the driving member. Each shaft 23 is provided with means for changing its rotation into a reciprocating motion, the form shown comprising eccentrics 26 which are provided with the straps 27 and a connecting rod 29, each connecting rod being fastened preferably by a suitable wrist pin 30 to a piston 31, each piston 31 reciprocating in one of the cylinders 17, and these pistons being preferably arranged so that two of them are on their outward limit of movement, these being diametrically arranged, the other two being on their inward limit of movement and being diametrically oppositely arranged and at right angles to the first mentioned cylinders, this arrangement eliminating, as far as possible, any vibration incidental to the rotation and reciprocation of these parts. The cylinders 17, along with the pistons, form air compressing means, the air being drawn in through suitable valved inlets, in the drawing the inlet valves 32 being illustrated, these valves being operated by a spring to normally hold them shut and assure their successful closing when not under pressure, it being understood that any suitable form of valve can be used in this situation.

An outlet 33 is provided in each cylinder, the outlet having an outlet valve 34 which is also preferably spring operated under normal conditions, although under pressure the pressure itself holds the valve shut. The outlet valve of each cylinder is connected to a duct or channel 35 which can be provided in a number of ways, but in the form shown is due to the plate 18 being cored, although the channel can be formed by placing grooved plates face to face. The channels 35 are all connected to a chamber 36, this air chamber being preferably annular so that all the air compressing elements act to force air into the chamber and hold it thus compressed when the outlet of the air chamber is closed or partly closed. This closure can be effected in a number of ways, the form shown comprising a collar 37 on a sliding regulating member 38 which, in the form shown, is in the shape of a disk. The outer end of the collar 37 closes the chamber 36 and can be slid forward inside of an opening 39 provided for the purpose within the plate 18, the plate 18 preferably having a flange 40 which extends over to engage the gear 25 or a collar thereof so as to keep the parts properly spaced. To release the pressure from the air chamber 36 the member 38 is moved forward and this causes openings or outlets to be pushed to where the air from the chamber 36 can escape, and to make the gradual escape of this air possible, and to provide for a fine adjustment or control, these openings 41 are made V-shaped or tapered, as will be understood. The face 42 of the member 38 and the face 43 of the part 20 are adapted to be brought into engagement to act as a brake when the outlet is opened to its fullest extent, the purpose of which will be described hereinafter.

To prevent the part 38 from turning, it is preferably mounted so that projections, such as the studs 44, slide in a suitable fixed member 45, which fixed member can have a depending part or a central portion forming a bearing for the shaft 10, as illustrated at 46. Suitable means for moving the member 38 can be devised, the form shown comprising a lever 47 pivoted at 48 and having a part 49 that is provided with a handle, the lower part 50 being forked and then suitably connected to the member 38 to provide for the sliding of the member 38 when the lever 47 is swung either forward or backward.

The operation of the device is as follows. The lever 49 is swung so that the member 38 is near or against the member 20, and they preferably abut when swung to a neutral or inoperative position so that the member 20 is held against "drifting" or rotating slowly, due to any undue friction of the parts. A suitable facing 51 is provided which sets up the proper friction and acts as a band or disk to hold the parts in frictional contact. When the parts are in this position the member 22 with the plate 18, which between them form the casing, are at rest, and the shaft 11 therefore is also at rest. The shaft 10 is rotating, the shaft 10 being the shaft that is connected to the engine or other source of power. The pinion 25 rotates the gears 24, and these in turn, through their eccentrics 26, operate the pistons of the cylinders and air is pumped through the air passages, being taken in through the respective inlets 32 and forced out through the outlets 33, passing down through the channels 35 into the chamber 36, and being adapted to pass out therefrom because the slots 41 are in a position to permit the air passing out from the chamber 36, these outlet passages being of sufficient area to permit the air compressed by the compressing means, to flow from the chamber 36. When, however, the driven member is to be rotated with the driving member, and they are not to be rotated relative to each other to as great an extent as when the driven member is at rest, the controlling means, which in the form shown is the collar 37, is moved toward the left and, if necessary, to the point where the air is entirely shut off, which point is illustrated in the drawing in Fig. 1. When the air is choked off in this way the compressed air in the passages 35 and in the chamber 36 soon causes sufficient back pressure on the air compressing means that the air compressing means cannot operate, and in this case such back pressure would stop the reciprocation of the pistons and thus in turn stop the rotation of the shafts 23, halt the rotation of the gears 24, and the pinion 25 thus acting against locked gears, would turn the whole casing 22 and with it the shaft 11. Intermediate positions will permit gradual escape, to the desired extent, of the air, and in this way speed can be increased and decreased gradually, without shock due to the change, without noise to any material extent and without undue wear on the parts. Another advantage of this construction is that when the clutch members are connected so as to rotate in unison or nearly so, in other words, when the maximum of power is being applied to the driven shaft from the driving shaft, the moving parts in the air compressing means are substantially at a standstill, due to the locking of the parts caused by the back pressure. It will be evident that when the parts are most freely operating, that is, the parts that operate the pistons are rotating due to the air outlets being substantially open, the abutting faces 42 and 51 are preferably in contact so as to prevent "drifting" of the casing 22 and consequently of the shaft 11, thus providing for a locking or positively secure holding of the driven member in an inoperative position when the maximum relief is granted to the fluid compressing means.

It will be understood that this invention can be utilized with different forms of fluid, but I have illustrated piston and cylinder means adapted for the compression of air as the fluid.

In Fig. 3 I illustrate, in a diagrammatic way, one of the particular advantages of this kind of transmission, this view showing how the air ejected or emitted from the transmission can be conducted by means of a pipe 52 to the muffler 53 of the engine 54 and thus be utilized to assist in forcing the products of combustion from the engine through the muffler, and thus relieving whatever back pressure an engine is subjected to by reason of the use of such muffler.

Having thus described my invention, I claim:

1. In a transmission, a driving member, a driven member, the members being rotatable relatively to each other, a compressing means having an air inlet passage leading from the external atmosphere thereinto, an inwardly opening check valve in said air inlet passage, an outlet passage leading from said compressing means to the external atmosphere, and an outwardly opening check valve in said outlet passage, the compressing means being operable when the members are rotated relatively to each other, and means for controlling the passage of compressed air through said outlet passage.

2. In a transmission, a driving member, a driven member, said members being adapted to be rotated relatively to one another, a plurality of air compressing means between the members and operable when the members are relatively rotated, a passage for compressed air common to all the members, and a single valve for controlling and preventing the passage of air from the compressing means, whereby the members are held against rotation relatively to each other.

3. A transmission comprising a driving member, a driven member, air compressing means mounted on the driven member, means for operating the air compressing means from the driving member when the members are rotated relatively to each other, means for controlling and preventing the passage of compressed air from the compressing means whereby said prevention acts to lock the compressing means and cause the members to rotate in unison, and means connected with said controlling means for holding the driven member against rotation when the controlling means is moved to a position where the compressed air can freely pass from the air compressing means.

4. A transmission comprising a driving member, a driven member, a plurality of means for compressing fluid, means for operating said compressing means, said operating means being mounted on the two members and operated by their rotation relatively to each other and one of said members having an air passage, and a single controlling means forming a wall of said passage and adapted for regulating the flow of fluid through said passage.

5. A transmission comprising a drive shaft, a driven shaft, a casing into which said shafts are projected, the casing being fastened to one of said shafts, an air compressing means in the casing, means for operating said compressing means, said operating means being actuated when the drive shaft rotates relatively to the driven shaft, and an annular shiftable member for regulating the flow of compressed air from said compressing means.

6. A transmission comprising a driving member, a driven member, said driven member being provided with an air compressing means operated when said driving member rotates relatively to the driven member and having an inlet passage leading from the external atmosphere into said air compressing means, an inwardly opening check valve in said inlet passage, an outlet passage leading from said compressing means to the external atmosphere, and an outwardly opening check valve in said outlet passage, and means for controlling the passage of air from the compressing means whereby said compressing means is provided with variable back pressure, whereby said compressing operating means is utilized to vary the ratio in the rotation of said members.

7. A transmission comprising a driving shaft, a driven shaft, a casing on the driven shaft, the casing having gears arranged therein, a pinion on the driving shaft and in mesh with said gears whereby the gears are rotated when either the driving shaft or the driven shaft is rotated relatively to the other, air compressing means operated from said gears, said casing having an inlet passage leading from the external atmosphere into said air compressing means, an inwardly opening check valve in said air inlet passage, an outlet passage leading from said compressing means to the external atmosphere, and an outwardly opening check valve in said outlet passage, and means for regulating the flow of air from the compressing means to the external atmosphere.

8. A transmission comprising a driving shaft, a driven shaft, a pinion on the driving shaft, a casing on the driven shaft, a gear in the casing and in mesh with the pinion on the driving shaft and adapted to be rotated thereby when the driving shaft is rotated and the driven shaft is at a standstill or rotated at a slower speed than the driving shaft, air compressing means operated from the gear, the casing having an air passage through which air from the compressing means is conducted, a sliding member on said driving shaft and located within the passage, said sliding member having means thereon for preventing, permitting and regulating the flow of air from said passage.

9. A transmission comprising a driving shaft, a driven shaft, a pinion on the driving shaft, a casing on the driven shaft, a gear in the casing and in mesh with the pinion on the driving shaft and adapted to be rotated thereby when the driving shaft is rotated and the driven shaft is at a standstill or rotated at a slower speed than the driving shaft, an air compressing means operated from the gear, the casing having an air passage with an outlet adjacent to said driving shaft, a sliding member on said driving shaft constructed to prevent, permit and to regulate the flow of air from the outlet of the passage, said sliding member being adapted to frictionally engage the casing when the outlet is opened to its fullest extent, and means for preventing the rotation of said sliding member.

10. A transmission comprising a driving shaft, a driven shaft, a casing, a pinion on the driving shaft, a gear in the casing and in mesh with the pinion, the casing being provided with a bore to form a cylinder, a piston in said cylinder, means for reciprocating the cylinder from said gear when the gear is rotated, an inlet valve in the cylinder, an outlet valve in the cylinder, the casing having a passage to conduct air from the outlet valve to a point adjacent to the driving shaft, a sliding member having a collar encircling the driving shaft, said collar having a solid portion and also having a cut-away portion, both of which portions can be passed across the outlet of the passage according to the direction in which the sliding member is moved, means for holding the sliding member against rotation, and co-acting means on the sliding member and the casing to hold the casing against rotation when the sliding member is moved to fully open the outlet of the air passage.

In testimony that I claim the foregoing I hereto set my hand this 2nd day of April, 1917.

EDMUND SCHMITT.

Copies of this patent may be obtained for five cents each, by addressing the "Commissioner of Patents, Washington, D. C."